United States Patent [19]

Berger

[11] Patent Number: 5,131,218
[45] Date of Patent: Jul. 21, 1992

[54] SINKING/FLOATING ROPE

[75] Inventor: George A. Berger, Lafayette, La.

[73] Assignee: American Manufacturing Company, Inc., Lafayette, La.

[21] Appl. No.: 553,872

[22] Filed: Jul. 16, 1990

[51] Int. Cl.$^5$ .................... D02G 3/36; A01K 91/00
[52] U.S. Cl. .................................. 57/211; 57/206; 57/231; 57/237; 43/44.98
[58] Field of Search ........................ 57/206–207, 57/211, 231, 237, 238; 43/44.98

[56] References Cited

U.S. PATENT DOCUMENTS

| | | | |
|---|---|---|---|
| 1,602,312 | 10/1926 | Qurin | 43/44.98 |
| 2,520,654 | 8/1950 | Rants | 43/44.89 |
| 2,562,340 | 7/1951 | Stanton | 57/213 |
| 2,591,628 | 4/1952 | Snyder | 57/211 |
| 3,201,930 | 8/1965 | Stirling | 57/211 |
| 4,267,864 | 5/1981 | Kocay | 57/210 X |
| 4,827,708 | 5/1989 | Verreet | 57/206 X |
| 4,902,552 | 2/1990 | Rohrbacher | 264/241 X |

FOREIGN PATENT DOCUMENTS

0058134 12/1982 Japan .................. 43/44.98

Primary Examiner—Daniel P. Stodola
Assistant Examiner—William Stryjewski
Attorney, Agent, or Firm—Louis Weinstein

[57] ABSTRACT

A unique fishing rope comprising floating and sinking portions. The sinking portion blended yarns made up of a blend of first and second non-metallic synthetic filaments in proportions to yield a sinking rope portion having a specific gravity greater than one. The sinking rope portion comprises strands having yarns of substantially the same diameter. The floating portion of the rope is formed by replacing selected ones of the blended yarns in each strand with yarns formed of a material having a specific gravity of less than one. The replacement yarns and the blended yarns are of the same diameter to enhance the integrity and strength of the rope. The yarns omitted from the sinking section and replaced with the yarns having a specific gravity less than one are terminated at staggered intervals and their replacement yarns are inserted at like staggered intervals forming a merged region between the sinking and floating portions having a tensile strength which is equivalent to the tensile strength of the sinking and floating portions. The rope material sensitive to ultraviolet radiation is surrounded and thus protected by the material resistant to ultraviolet radiation. The ultraviolet sensitive material may also be treated with a stabilizer material which enhances resistance to ultraviolet radiation.

30 Claims, 6 Drawing Sheets

SINKING/FLOATING ROPE

FIELD OF THE INVENTION

The present invention relates to ropes, and more particularly, to a novel floating/sinking rope formed of non-corrosive/non-toxic materials having enhanced abrasion and UV resistance and in which the strands of the floating and sinking portions of the rope are joined in a unique way to enhance the breaking strength of the rope over its entire length and especially in the region where the floating and sinking portions are joined.

BACKGROUND OF THE INVENTION

Historically, crab and lobster fishermen have used two ropes joined together by a knot and attached one end to a float and the other end to a trap or "pot" employed for deep water fishing.

A normal rigging employs a sinking line having a specific gravity greater than one, i.e. a specific gravity greater than that of water, which extends from the float and having a length typically on the order of twenty-two (22) fathoms. The sinking line prevents the rope from floating upon the surface, thereby creating a potential hazard. At this point, the sinking line is joined, i.e. knotted to, a floating line having a specific gravity less than one with the length of the floating line being determined by the depth of the water. The floating line is then joined to the "pot". This design is extremely advantageous for use in such deep sea fishing since fishermen desire that the line attached to the "pot" should not scare the catch. This objective is accomplished by the floating rope section which floats above the "pot".

Joining the floating and sinking rope sections with a knot is disadvantageous since a knot of any type reduces the strength of a line by 50 percent. The knowledge of this degradation in strength has lead to the development of a partially leaded polypropylene line having a lead wire incorporated into a portion of the rope, said lead wire extending over a length of the order of twenty-two fathoms. A sufficient amount of lead is used to overcome the specific gravity of polypropylene which is less than that of water. In producing the rope, when the length of twenty-two fathoms is reached, the lead wire is terminated and the remainder of the rope length is formed by continuing the polypropylene portion of the rope which, having a specific gravity less than water (i.e., less than 1.0), floats.

Although the last-mentioned design provides a floating/sinking rope yielding the desired objectives of the fishermen, there are nevertheless some important deficiencies which include the following:

1. In cold water the ductility of the lead is significantly reduced and the lead becomes brittle. Due to the natural elongation of the polypropylene line when in use (the elongation is commonly of the order of 15 percent) the lead breaks, and, through continued use, the lead works its way out of the line thereby decreasing its sinkability.

2. The lead lost into the sea becomes an environmental threat, due to its toxicity (i.e., lead is poisonous).

3. The polypropylene line softens due to the voids caused by the lead which has worked its way out of the polypropylene line causing the line to wear more quickly thus significantly reducing its operating life.

4. The lay of the entire line changes as the rope, when floating freely, works itself toward a neutral lay or degree of twist.

It is, therefore, extremely advantageous to provide a rope having all the characteristics of the floating/sinking ropes of the prior art which overcome the disadvantages of lead filled rope and rope whose floating and sinking portions are knotted together.

BRIEF DESCRIPTION OF THE INVENTION

The present invention is characterized by comprising a floating/sinking rope which is formed of materials which are non-metallic and hence non-corrosive and, more particularly, which are non-toxic. The rope is formed of synthetic materials and, more particularly, synthetic plastic materials of first and second types having specific gravities respectively greater than and less than 1.0 (1.0 being the specific gravity of water). The materials preferably have contrasting colors to differentiate the floating and sinking rope portions by a simple visual observation.

The floating portion of the floating/sinking rope is preferably formed first and is comprised of strands, each having a plurality of blended yarns formed of a combination of the materials of said first and second specific gravities whose proportions are selected to yield yarns having a resultant specific gravity less than one.

The blended yarns are arranged so that the filaments having a specific gravity greater than one and which are also resistant to ultraviolet radiation and have a superior abrasion resistance, are arranged to form a cover layer surrounding the filaments having a specific gravity less than one.

Rope strands are formed by combining a predetermined number of the blended yarns, all of substantially the same diameter. When the strand being formed reaches a predetermined length, selected yarns of said strand are terminated in a staggered fashion along the length of the strand and each terminated yarn is replaced with a yarn formed only of fibers having a specific gravity greater than one to thereby form the sinking rope section. The yarns of the sinking rope section which are not terminated are continued over the entire length of the floating section. By terminating the selected yarns of the floating rope section in a staggered fashion and hence initiating the replacement yarns for the sinking rope section in a complementary staggered fashion and by forming the blended and unblended yarns of substantially equal diameters, the yarns which are twisted to form each strand have a breaking strength in the transition region between the sinking and floating rope portions which is equal to the breaking strength of the sinking and floating rope portions themselves.

The fibers having a specific gravity greater than one are formed of a material having a high abrasion resistance and also having a high resistance to ultraviolet radiation. By surrounding the fibers of the blended yarns having a specific gravity less than one, which fibers are also highly sensitive to ultraviolet radiation, with the fibers having a specific gravity greater than one, the overall abrasion resistance of the rope and the overall resistance to UV radiation is greatly enhanced.

Once strands having sinking and floating portions of the desired length are formed, a plurality of such strands (typically three) are joined together, i.e. either twisted or braided, to form the floating/sinking rope. The elimination of knots and/or lead employed in prior art designs eliminates all of the disadvantages of floating/sinking rope of the lead filled type and the method of joining said sections provides a rope which has no reduced strength sections, especially in the transition region between the floating and sinking portions.

OBJECTS OF THE INVENTION

It is, therefore, one object of the present invention to provide a novel floating/sinking rope which totally avoids and eliminates metallic, corrosive and toxic elements typically utilized to form the sinking portion thereof.

Still another object of the present invention is to provide a novel floating/sinking rope having a sinking portion of enhanced flexibility as compared with conventional sinking rope portions.

Still another object of the present invention is to provide a novel floating/sinking rope having floating and sinking rope portions which are joined in a unique manner and which eliminates the need for knotting said sections together as well as eliminating the disadvantages which result from a knotted rope.

Still another object of the present invention is to provide a novel floating/sinking rope having a substantially uniform diameter over the entire length thereof.

Another object of the present invention is to provide a novel floating/sinking rope formed of synthetic materials having enhanced abrasion resistance and resistance to ultraviolet radiation as compared with conventional rope.

Still another object of the present invention is to provide a novel floating/sinking rope formed of synthetic materials of different specific gravities arranged in a fashion to form floating and sinking rope portions joined in a transition section in a manner such that the breaking strength of the transition section is substantially equivalent to the breaking strength of the floating and sinking portions.

BRIEF DESCRIPTION OF THE FIGURES

The above, as well as other objects of the present invention will become apparent when reading the accompanying description and drawings in which:

FIG. 2b is a sectional view showing a floating section of a three strand rope, each strand embodying the design shown in FIG. 2a;

FIG. 3b shows a sectional view of the sinking section of a three strand rope embodying the strand arrangement shown in FIG. 3a;

DETAILED DESCRIPTION OF THE INVENTION

Figure 1:
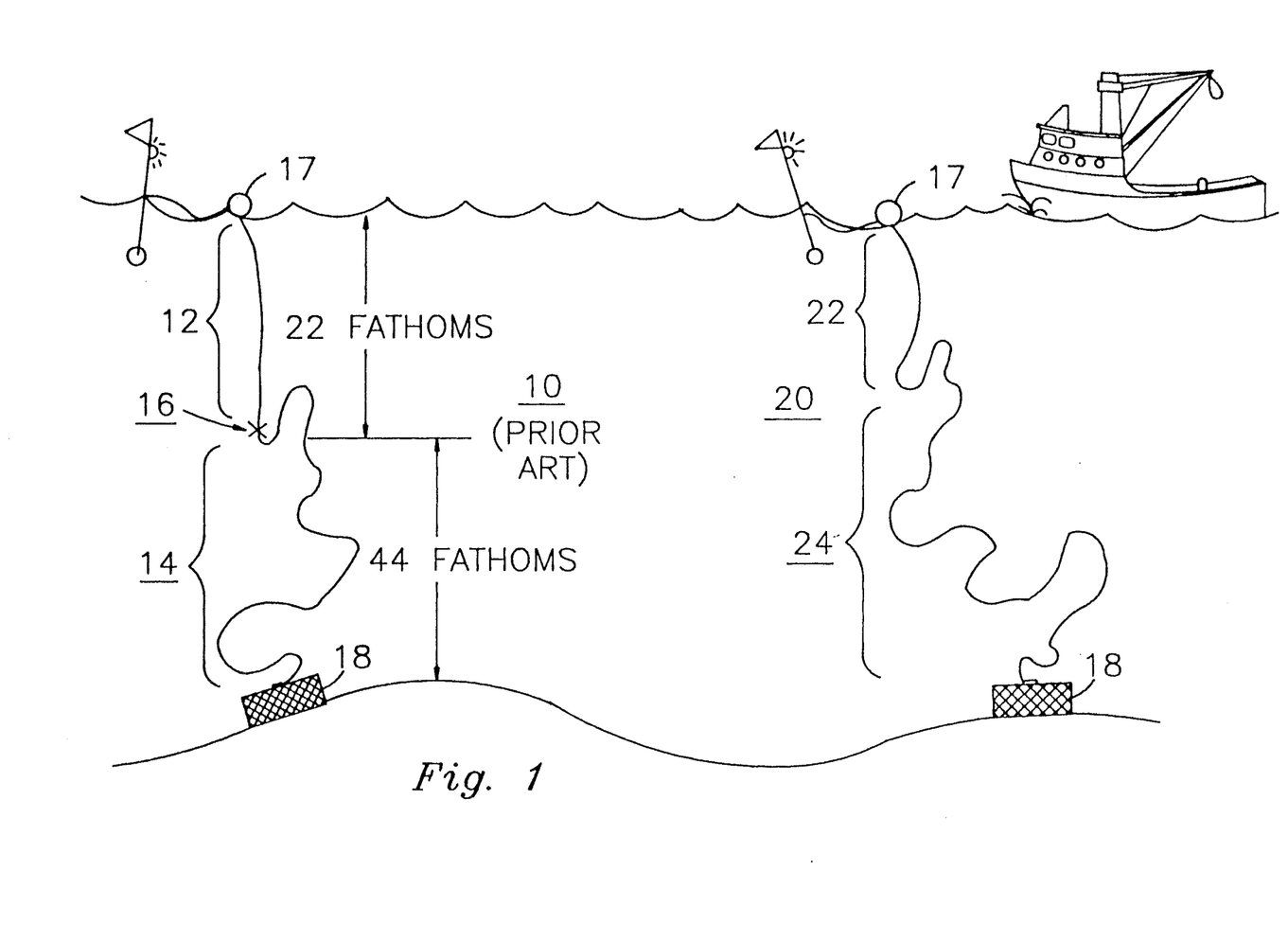
FIG. 1 shows a simplified diagrammatic view comparing the rope of the present invention with conventional rope when in use.

FIG. 1 shows a comparison of a fishing rope 10 of the prior art compared with a fishing rope 20 embodying the principles of the present invention.

Fishermen seeking deep sea catch such as crab and lobster, for example, have traditionally employed a rope 10 shown in FIG. 1 which is comprised of two rope portions, namely a sinking line portion 12 and a floating line portion 14 joined together by a knot 16. The sinking line 12, having a specific gravity greater than one is coupled at its upper end to float 17 and is coupled at its lower end to the upper end of floating line 14 by knot 16. The floating line, which has a specific gravity of less than one, has an overall length typically determined by the depth of the water. In the example shown in FIG. 1, the floating line has a length of forty-four fathoms. The lower end of floating line 14 is coupled to the "pot" 18. A knot of any type is known to reduce the strength of the rope by 50 percent, thereby yielding a rope 10 which is of inferior quality.

Rope 20 of the present invention has a sinking line portion 22 whose upper end is coupled to float 17 and a floating line portion 24 whose lower end is coupled to "pot" 18. Contrary to the design of rope 10, the rope 20 of the present invention has no knots, and makes a smooth transition from the sinking line portion 22 to the floating line portion 24 thereby significantly enhancing the overall strength of the line. As will be more fully described hereinbelow, the novel rope 20 of the present invention eliminates the need for metallic elements within the rope thus eliminating possible corrosion and also yields a non-toxic rope which does not contaminate or pollute the water and the inhabitants thereof.

As was pointed out hereinabove, one rope design which eliminates the need for knotting sinking and floating lines together utilizes a lead wire within the sinking rope portion. The amount of lead employed is a function of the rope material whose specific gravity is less than one. The lead wire is simply terminated at the lower end of the sinking rope portion when making the rope and the remainder of the rope, i.e. the floating line portion, is produced with the lead wire omitted. The material of the floating line portion obviously has a specific gravity of less than one in order to achieve the desired results.

The disadvantages of a lead-filled rope have been pointed out hereinabove and the lead-filled rope and knotted rope 10 shown in FIG. 1 clearly establish the need for a rope having the advantageous features of the present invention and, more specifically, which eliminates the disadvantageous features of lead-filled and knotted ropes of the sinking/floating type.

Figure 2A:
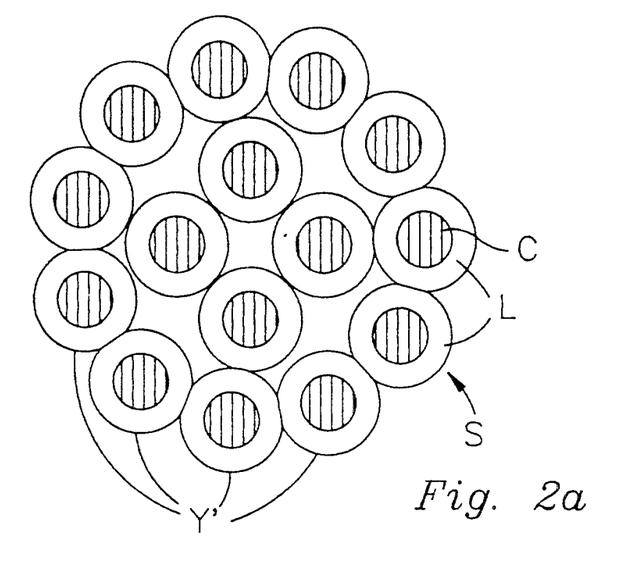
FIG. 2a shows a sectional view of one strand of a floating section of rope designed in accordance with the principles of the present invention.
Figure 2B:
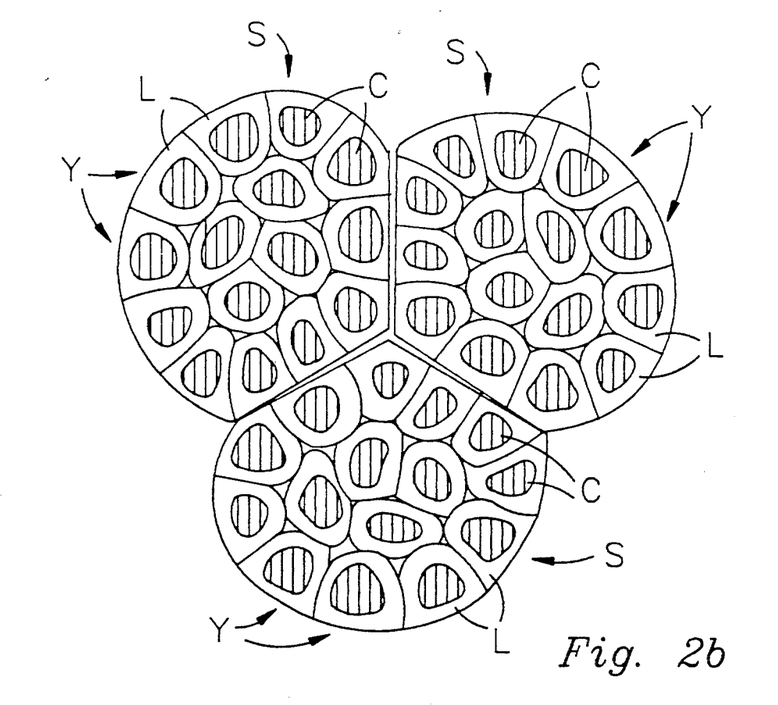

The present invention is characterized by comprising a sinking rope portion which is preferably produced first and which is comprised of a plurality of strands, each strand being substantially of the same common diameter and being formed of a plurality of blended yarns formed of first and second type material which are blended in accordance with a proportionality which yields strands having a specific gravity greater than one. FIG. 2a shows a typical strand S employed to make the sinking rope section. Strand S is comprised of a plurality of individual yarns Y each having the same common diameter. Each of the yarns Y is formed of first and second fibers wherein one of said fibers has a specific gravity which is less than one while the other fiber has a specific gravity of greater than one. These fibers are blended in such a manner as to form a yarn Y which has a resultant specific gravity of greater than one. Yarns Y will hereinafter be referred to as "blended yarns". In one preferred embodiment, the strand of the sinking rope section is formed of a polyester fiber "veneered" over a polyolefin fiber to produce a blended yarn that contains sufficient polyester, having a specific gravity of 1.38, to more than counterbalance the buoyant effect of the polyolefin which has a specific gravity of 0.91. The desired ratio of polyester to polyolefin is 51:49 in the preferred embodiment of the present invention. Thus, as shown in FIG. 2a, the polyolefin fibers form the core C of each yarn while the polyester fiber forms the outer layer L which completely surrounds the core C of each yarn Y.

The polyolefin fibers are sensitive to ultraviolet radiation. By covering the polyolefin fibers 100 percent with the polyester fibers, which are 100 percent ultraviolet resistant, the polyolefin fibers are protected from degradation due to ultraviolet radiation. In addition, the polyester fibers are also more resistant to abrasion than the polyolefin fibers thereby reducing abrasion between and among neighboring yarns within each strand, as well as between yarns of the adjacent strands forming the rope.

The polyolefin fibers may also contain a hindered amine light stabilizer (HALS) that resists ultraviolet degradation. The amount of stabilizer introduced guarantees minimal strength loss when tested at the approximate latitude of 30 degrees for one year of outdoor exposure.

Each of the blended yarns Y are of a common diameter, as shown.

Figure 3A:
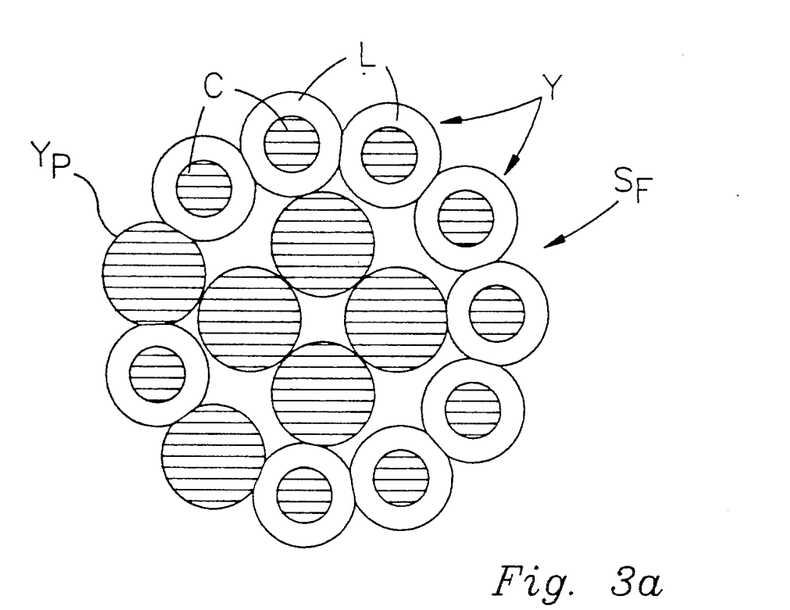
FIG. 3a is a sectional view showing one strand of a sinking section of the rope embodying the principles of the present invention.

The method of manufacture of the sinking section, the strands of which are produced first, is the production of the blended yarns to insure sinkability. When the normal twenty-two fathom length is reached, a sufficient number of the blended yarns in the sinking section (normally five to six) are exchanged for 100 percent polyolefin yarns. More specifically, the blended yarns Y are removed and are replaced by polyolefin yarns Y$_P$ as shown in FIG. 3a. Polyolefin yarns are formed of polyolefin fibers wherein each yarn Y$_P$ has a diameter substantially the same as the diameter of the blended yarns Y. The polyolefin yarns which, as was described hereinabove, have a specific gravity of 0.91, together with the ratio of the blended to the polyolefin yarns within the floating strand S$_F$, is sufficient to form a strand S$_F$ which floats. The ratio of polyester to polyolefin is changed from the sinking rope section which is 51:49 to the desired 30 percent polyester, 70 percent polyolefin. The yarn exchange preferably takes place over a three to four fathom length in order to maintain the diameter of the rope uniform and in order to maintain its strength and integrity.

Figure 4:
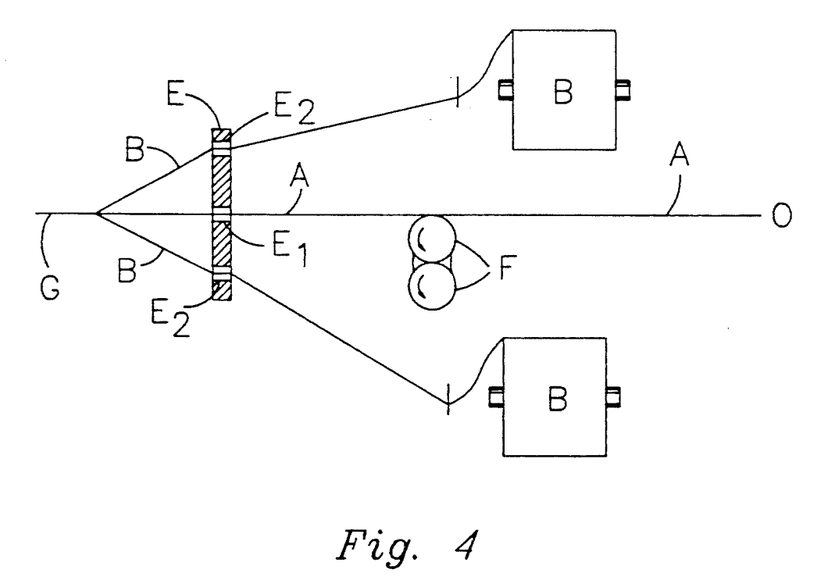
FIG. 4 shows a schematic diagram of a system for forming strands in accordance with the principles of the present invention.
Figure 4A:
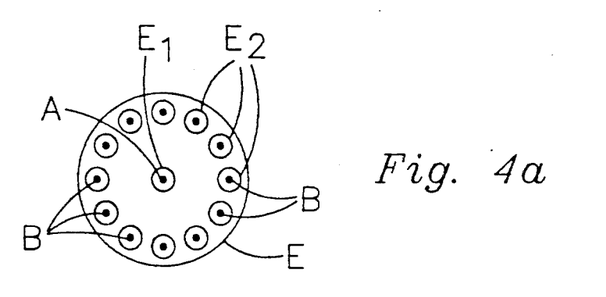
FIG. 4a is a front view of the reeve plate shown in FIG. 4.

The manner of forming the blended yarn will now be described in greater detail in connection with FIG. 4 which shows a blended yarn veneering reeve (FIG. a) having a central opening E1 for receiving a yarn polyolefin fibers and openings E2 about its circumferential portion each for receiving yarns B comprised of polyester fibers.

The polyolefin yarn A is derived from a source O and passes through the central opening E1 in reeve plate E (see FIG. 4a). A plurality of bobbins B containing polyester yarn are arranged at spaced intervals about an imaginary circle and each bobbin feeds a polyester yarn through an associated one of the openings E2 in reeve plate E arranged about the circumference of the plate. FIG. 4 shows only two such yarns and bobbins for purposes of simplicity.

All of the yarns passing through the 1 reeve plate are drawn together to form a blended yarn G comprised of twisted polyolefin yarns and polyester yarns. The polyolefin yarn A in the extrusion line is maintained at a higher tension in moving toward the yarn twister, located at G, as compared with the tensions of the polyester yarns. Tension wheels F are operated to provide the desired tension. The tension differential causes the polyester yarns to wrap around the polyolefin yarn. The number of yarns of polyester B employed in forming a blended yarn and the line speed of the yarn twister determine the effectiveness of the cover. The twister, although not shown, may be any conventional twister capable of providing the desired twist. For example, note the twister 55 described in U.S. Pat. No. 3,201,930 and further disclosed in FIGS. 5 and 6 of said patent. Alternatively, any other suitable twister may be employed. The individual polyester and polyolefin yarns are preferably twisted preparatory to formation of the blended yarn shown in FIG. 4. The number of polyester yarns employed and the line speed of the yarn twister determine the effectiveness of the cover. So long as the relative tensions between the polyester and polyolefin yarns are different and so long as the tension on the polyolefin yarn is greater than the tension on the polyester yarns, the yarns with least tension will wrap around the higher tension yarn.

The number of fibers in the blended yarn is chosen to yield a composite blended yarn having a specific gravity greater than one. In the preferred embodiment, when employing polyester and polyolefin fibers, the ratio of polyester to polyolefin is 51 percent to 49 percent (i.e. 51:49). Given the specific gravities of these two materials, the resulting specific gravity of the blended yarn is greater than one.

In order to form a floating/sinking rope, the blended yarns are formed in the manner described in connection with FIG. 4 and the 100 percent polyolefin yarns are formed in any suitable fashion.

Figure 5A:
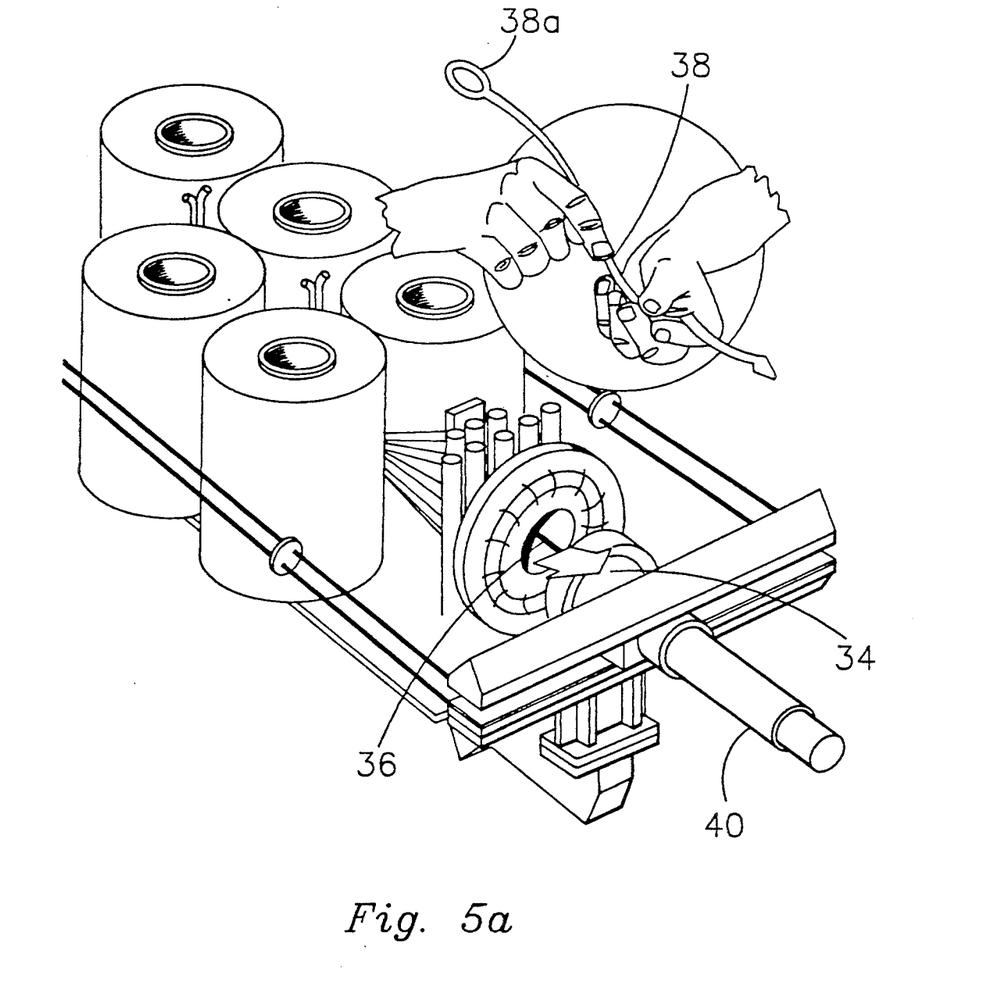
FIG. 5a is a perspective view of apparatus for forming a floating/sinking rope.
Figure 5B:
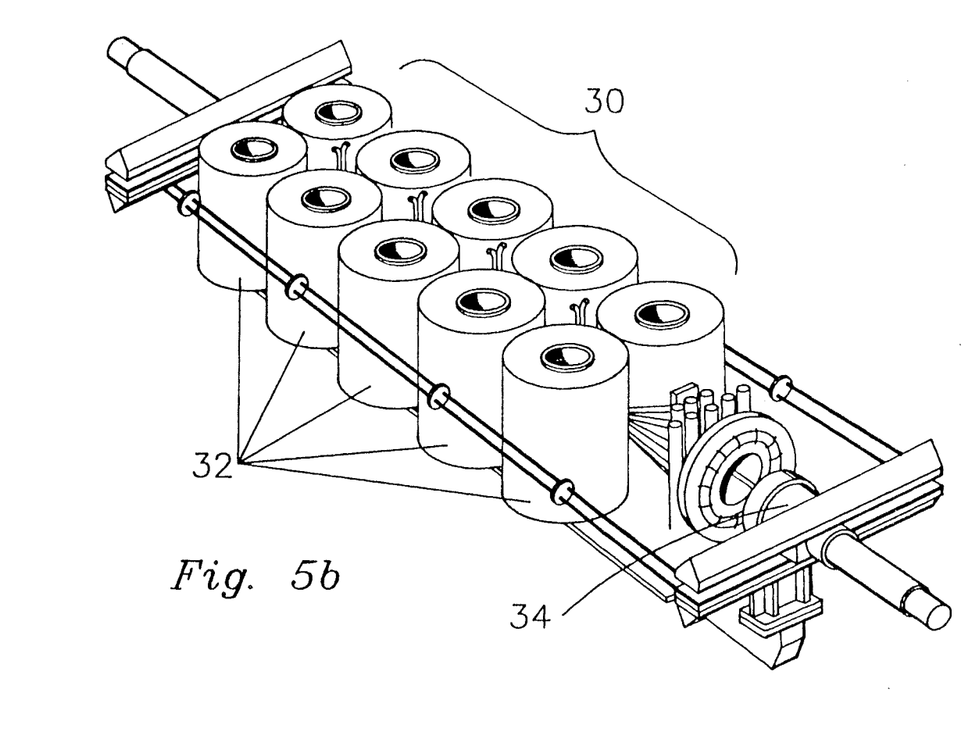
FIG. 5b is a perspective showing of a detailed view of a portion of the apparatus for forming yarns in accordance with the principles of the present invention.

A strand of all blended yarns is formed utilizing the apparatus shown in FIGS. 5a and 5b. The rope strand is started with all yarns being the blended yarns Y (see FIG. 2a) having a specific gravity greater than one. FIG. 5b shows a strand creel 30 provided with a plurality of yarn bobbins 32 of the aforementioned blended yarns shown, for example, in FIG. 2a. The blended yarns are drawn through a strand die 34 and are ultimately led to a twister, for example, of the type described hereinabove. When a predetermined length of sinking rope is formed, selected ones of the blended yarns are exchanged by terminating selected ones of the blended yarns and switching them with 100% polyolefin yarns. This is accomplished by removing one of the packages of blended yarn from the strand creel 30 and replacing this package with a 100 percent polyolefin yarn package. The polyolefin yarn leader 36 is inserted into the center of the strand at the strand die 34 utilizing a strand insertion tool 38 shown in FIG. 5a. The leader end of the 100 percent polyolefin yarn is looped through the eye 38a of insertion tool 38. The tool 38 is pulled through the strand being formed within the tubular member 40. By looping the new yarn through the eye 38a of tool 38 and pulling the tool through the strand, the new yarn is introduced into the strand without a knot. This method insures both a substantially constant diameter and constant strength for the strand and thereby provides a rope of constant strength.

All of the blended yarns chosen to be replaced with the 100 percent polyolefin yarn are exchanged in a staggered fashion, preferably over a twenty foot length of strand to maintain rope strength and diameter uniform throughout the transition region between the floating and sinking portions. The transition section thus gradually moves from negative buoyancy to positive with no discernible change in its diameter. This is accomplished by employment of the staggered method and further by forming the blended yarns and the 100 percent polyolefin yarn of substantially the same diameter and twisting the yarns forming the strand.

In one preferred embodiment, the floating and sinking rope sections are made easily distinguishable to the eye by utilizing polyolefin yarns of a first color which replace the white blended yarns employed in the sinking portion of the rope thus aiding in a simple differentiation of the sinking and floating rope portions.

When the proper number of blended yarns have been replaced by 100 percent polyolefin yarns, the ratio of blended to polyolefin yarns is maintained throughout the remaining length of the rope. Typically, a floating-/sinking rope has a sinking rope section of twenty-two fathom length and a floating rope section of the order of forty-four fathom length for a total length of sixty-six fathoms. However, any other rope length may be utilized depending upon the needs of the user and without departing from the rope design of the present invention.

The strands of the sinking rope portion are twisted together to provide the desired lay. FIGS. 2a and 3a show the cross-sectional configuration of a three strand rope designed in accordance with the principles of the present invention. If desired, the rope may be formed of a greater number of strands and, if desired, may also be a multi-strand braided rope.

By staggering the terminated blended yarns over a three to four fathom length (typically over a transition region of the order twenty feet) the diameter of the rope is maintained constant through the sinking rope portion, the transition region and the floating rope portion. In an embodiment wherein five to six blended yarns are terminated and replaced by an equal number of 100 percent polyolefin yarns, the individual yarns terminated may be spaced from one another in a staggered fashion so as to be of the order of two to three feet apart, it being understood that each of the blended yarns to be replaced are substituted by 100 percent polyolefin yarn in accordance with the method described hereinabove in conjunction with FIGS. 5a and 5b.

Figure 3B:
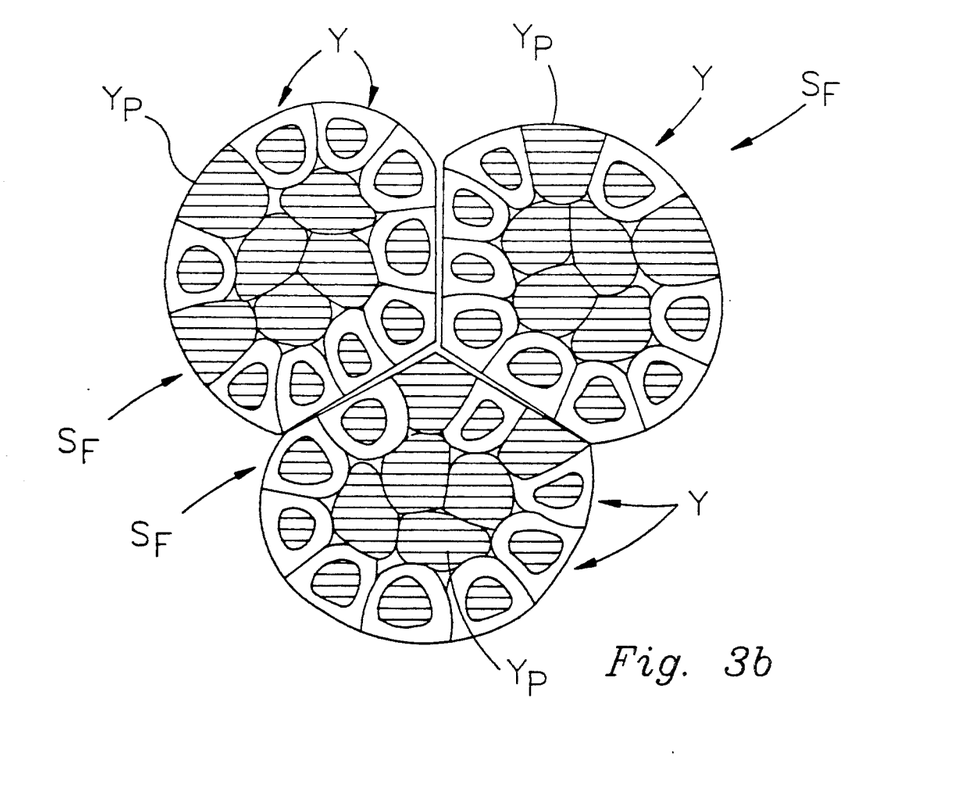

All of the strands of the sinking rope section of the three strand rope may be formed simultaneously and then twisted together to form the cross-section as shown in FIG. 2a. The transitions of each strand may be obtained in the manner described hereinabove and, once the blended yarns have been replaced in the staggered fashion by 100 percent polyolefin yarns, as described hereinabove, the strands of the floating rope section may then be twisted together to form a cross-section as shown in FIG. 3b. It should be noted that the blended yarns not replaced extend the entire length of the rope (sixty-six fathoms, for example). The twisting of the individual strands and the ultimate twisting of the strands forming the multiple strand rope enhance the strength of the rope in the transition region between the sinking and floating rope sections by tightly maintaining the replacement yarns in the strand.

Although the preferred embodiment described herein is preferably formed of polyolefin and polyester fibers, it should be understood that the same technique may be utilized by the employment of fibers having specific gravities which are respectively greater than and less than one and which have abrasion resistance and ultraviolet resistance preferably similar to that of the fibers employed in the rope of the present invention.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A rope for use in fishing comprising:
    a floating portion of a first predetermined length and a sinking portion of a second predetermined length;
    each of said rope portions comprising a plurality of strands;
    the strands of said sinking portion each being comprised of a plurality of first groups of blended yarns each of said groups being comprised of a first type yarn of non-metallic fibers having a specific gravity less than one and a second type yarn of non-metallic fibers encircling said first type yarn and having a specific gravity greater than one;
    the ratio of said first and second yarns in each of said first groups being selected so that the specific gravity of each first group of blended yarns is greater than one;
    said floating portion strands being comprised of selected ones of said first groups of blended yarns and a predetermined number of second groups of unblended yarns, each of said second groups being comprised of a plurality of yarns of said first type of fibers and each of said second groups of yarns having a specific gravity which is less than one;
    the ratio of said second groups of yarns to said first groups of yarns in said floating section being selected so that the floating portion strands have a resulting specific gravity which is less than one;
    only selected ones of the first groups of blended yarns in said sinking portion of rope extending the entire length of the rope and comprising the only first groups of yarns in said floating portion, the remaining yarns in said floating portion comprising a plurality of said second groups of yarns;
    the floating and sinking portions having a predetermined breaking strength; and
    the blended and unblended yarns cooperating to provide a rope of uniform thickness over the length thereof and wherein the breaking strength of the rope in the region where the floating and sinking portions are joined is substantially equal to the breaking strength of the floating and sinking portions.

2. The rope of claim 1 wherein the first groups of yarns which do not extend over the entire length of said rope each extend different predetermined distances into said rope floating portion.

3. The rope of claim 2 wherein each of said predetermined different distances are less than the length of said rope floating portion.

4. The rope of claim 3 wherein said sinking and floating portions each have substantially the same predetermined breaking strength, said predetermined different distances being selected to provide a breaking strength of the rope at the joining region of said floating and sinking portions of said rope to be substantially the same as the breaking strength of said floating and sinking portions.

5. The rope of claim 2 wherein the yarns of said second type in said rope floating portion extend different predetermined distances into said rope sinking portion.

6. The rope of claim 2 wherein the minimum length of said predetermined different distances whereby selected ones of the first group of yarns extend into the strands of the floating portion is substantially two (2) feet.

7. The rope of claim 6 wherein the length of each of the remaining predetermined different distances greater than said minimum distance is greater than said minimum length by an integral multiple of two (2) feet.

8. The rope of claim 1 wherein the length of said rope floating portion is substantially forty-four fathoms.

9. The rope of claim 1 wherein the length of said rope sinking portion is substantially twenty-two fathoms.

10. The rope of claim 1 wherein the first groups and the second groups of yarns have an annular shape, the diameter of each of the first groups of yarns being substantially equal to the diameter of the second groups of yarns in both said floating and said sinking portions.

11. The rope of claim 1 wherein each of said first groups of blended yarns comprises a plurality of yarns of fibers of said second type wrapped around a centrally located yarn of fibers of said first type thereby forming one of said first groups of blended yarns.

12. The rope of claim 11 wherein the first groups and the second groups of yarns have an annular shape, the diameter of each of the first groups of blended yarns is substantially equal to the diameter of the second groups of yarns in both the floating and sinking portions.

13. The rope of claim 11 wherein each first group of blended fibers is constructed so that the yarns of said second type of fiber is formed of a material which is resistant to ultraviolet light and the yarns of said second type of fiber are wrapped around said yarns of said first type fiber in such a manner as to substantially block ultraviolet light from reaching the yarns of said first type of fiber.

14. The rope of claim 1 wherein the number of strands in said rope sinking portion and said rope floating portion are equal.

15. The rope of claim 14 wherein the number of strands is at least two.

16. The rope of claim 14 wherein each strand has the same number of yarns in both the floating and the sinking portions.

17. The rope of claim 16 wherein all of the strands have substantially the same diameter in both the floating and the sinking portions.

18. The rope of claim 17 wherein the outer diameters of the rope sinking and floating portions are substantially the same.

19. The rope of claim 1 wherein all of the fibers are synthetic, the second type of fiber being formed of polyolefin.

20. The rope of claim 19 wherein the first type of fiber is formed of polyester.

21. The rope of claim 20 wherein said first and second types of fibers respectively making up each of said first group of blended yarns are polyolefin and polyester, the ratio of polyolefin fibers to polyester fibers in each first group of yarns being 51:49.

22. The rope of claim 1 wherein all of the fibers are synthetic, the first type of fiber being formed of polyester.

23. The rope of claim 1 wherein said first type of fiber is sensitive to ultraviolet light;
said first type of fiber being treated with a material to enhance the resistance of the first type of fiber to ultraviolet light.

24. The rope of claim 1 wherein said first type of fiber is treated with a material to enhance the resistance of the first type of fiber to ultraviolet light.

25. The rope of claim 24 wherein said material is an additive introduced into the first type of fiber material, additive being a hindered amine light stabilizer (HALS) type ultraviolet concentrate.

26. The rope of claim 25 wherein said first type of fiber is formed of polyolefin; said HALS type concentrate being introduced into the polyolefin.

27. The rope of claim 1 wherein said first and second fibers are each of a contrasting color.

28. The rope of claim 1 wherein the number of first and second groups of yarns in each strand of said floating portion is equal to the number of first groups of yarns in each strand of said sinking portion.

29. The rope of claim 1 wherein said floating and sinking portions are each of a contrasting color.

30. The rope of claim 1 wherein each second group of unblended yarns in each strand of the floating portion replaces an associated one of the predetermined first groups of yarns removed from each strand of the floating portion.

* * * * *

UNITED STATES PATENT AND TRADEMARK OFFICE
CERTIFICATE OF CORRECTION

PATENT NO. : 5,131,218
DATED : July 21, 1992
INVENTOR(S) : George A. Berger

It is certified that error appears in the above-identified patent and that said Letters Patent is hereby corrected as shown below:

Column 5, line 59, after "reeve" insert --plate E--

Column 5, line 59, change "(FIG. a)" to --(FIG. 4a)--

Column 5, line 60, after "yarn" insert -- comprised of--

Column 6, line 5, after "the" delete "1"

Signed and Sealed this

Seventh Day of December, 1993

Attest:

BRUCE LEHMAN

Attesting Officer    Commissioner of Patents and Trademarks